US005893540A

United States Patent [19]
Scott

[11] Patent Number: 5,893,540
[45] Date of Patent: Apr. 13, 1999

[54] KEYBOARD SADDLE

[75] Inventor: Elizabeth K. Scott, Brisbane, Calif.

[73] Assignee: WebTV Networks, Inc., Mountain View, Calif.

[21] Appl. No.: 08/923,499

[22] Filed: Sep. 4, 1997

[51] Int. Cl.⁶ .................................................. B68G 5/00
[52] U.S. Cl. .............................. 248/118; 108/43; 248/918
[58] Field of Search ..................... 248/118, 118.1, 248/118.3, 118.5, 346.01; 108/43

[56] References Cited

U.S. PATENT DOCUMENTS

| | | | |
|---|---|---|---|
| 4,052,944 | 10/1977 | Jennings | 108/43 |
| 4,765,583 | 8/1988 | Tenner | 108/43 |
| 5,125,606 | 6/1992 | Cassano et al. | 248/918 |
| 5,131,614 | 7/1992 | Garcia et al. | 248/918 |
| 5,143,341 | 9/1992 | Juster | 248/118 |
| 5,263,423 | 11/1993 | Anderson | 108/43 |
| 5,355,811 | 10/1994 | Brewer | 108/43 |
| 5,593,128 | 1/1997 | Odom et al. | 248/918 |
| 5,732,928 | 3/1998 | Chang | 248/918 |

*Primary Examiner*—Ramon O. Ramirez
*Assistant Examiner*—Robert Lipcsik
*Attorney, Agent, or Firm*—Workman, Nydegger & Seeley

[57] ABSTRACT

A keyboard saddle which sits on a user's legs while the user is using a keyboard, and which comfortably and reliably holds the keyboard in place while it is being used. The keyboard saddle includes a pillow-like container formed of a material that is essentially non-slippery when placed on the user's legs or clothing and which is filled with a stuffing material which has sufficient weight to cause the pillow-like container to assume a weighted, malleable character so that it will conform to the user's legs when placed thereon. Hook and loop fasteners are secured directly to the top of the pillow-like container so that the keyboard can be selectively and easily attached or detached therefrom.

4 Claims, 6 Drawing Sheets

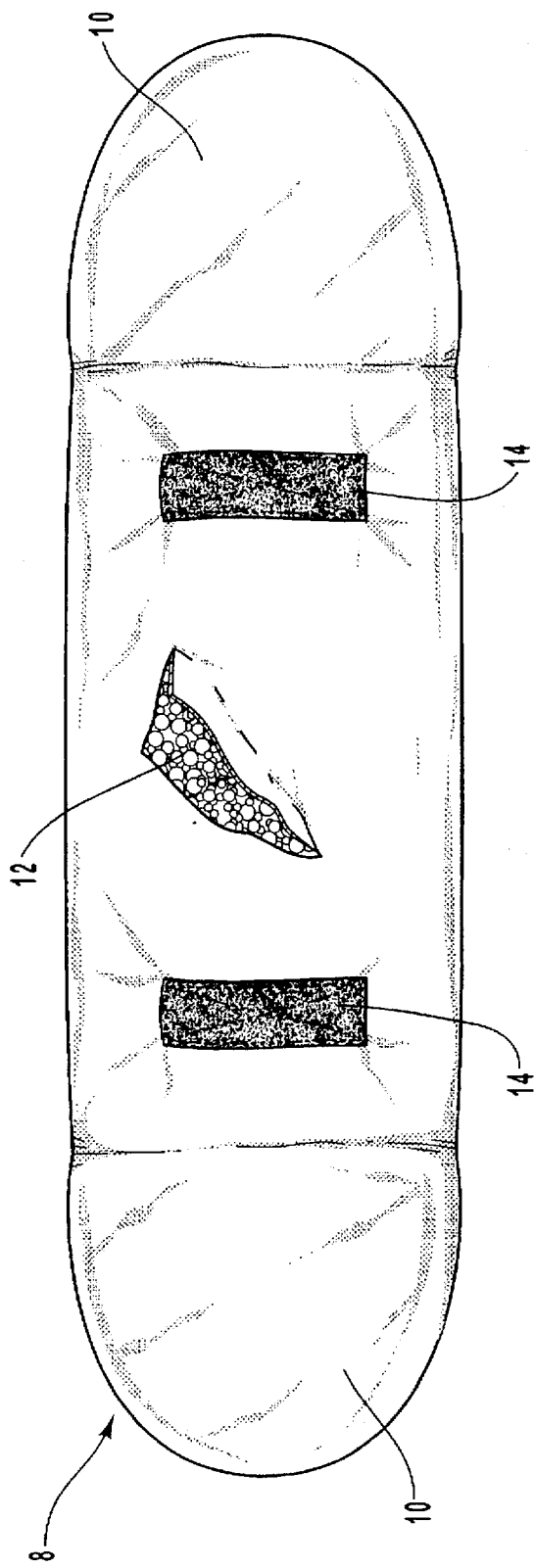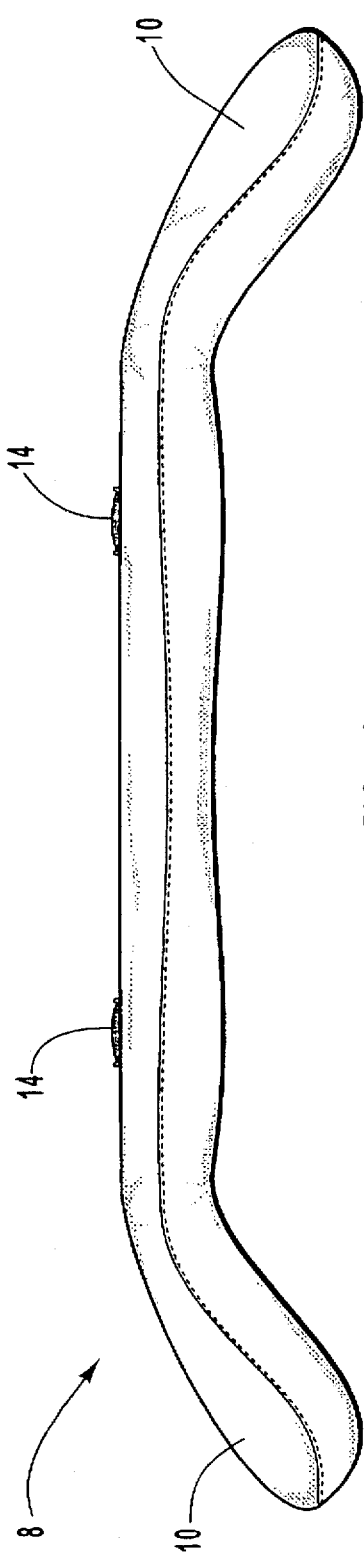

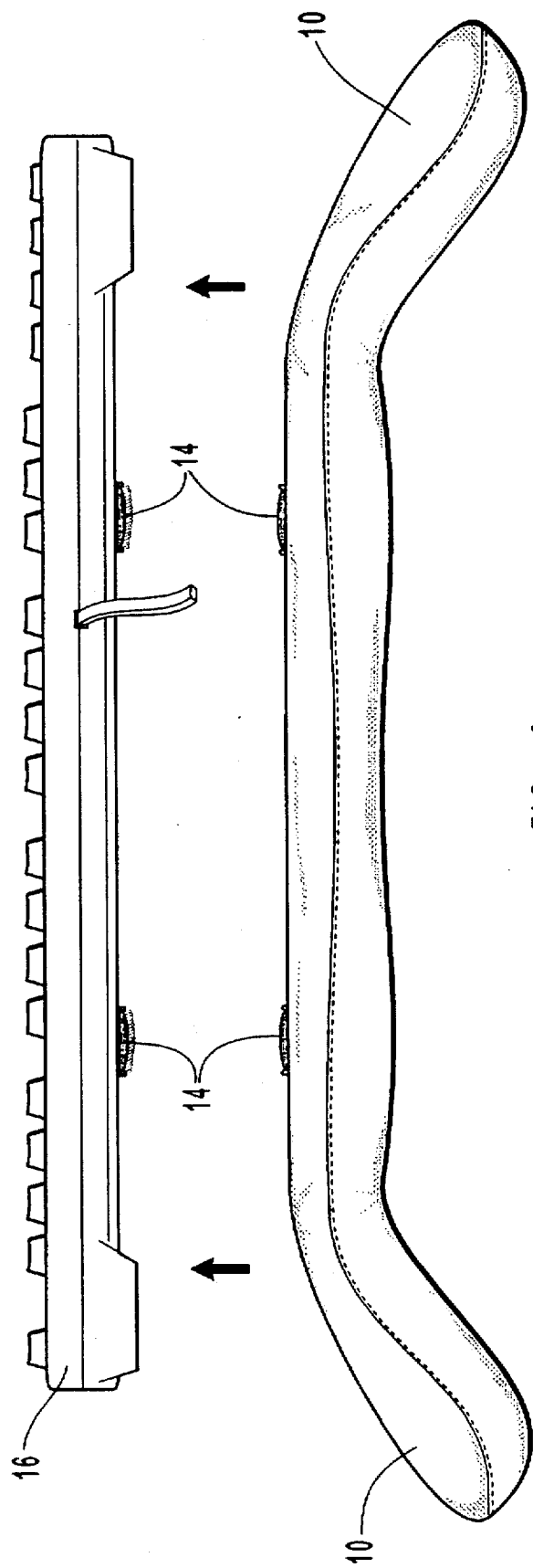

KEYBOARD SADDLE

FIELD OF THE INVENTION

The present invention pertains to the field of computer accessories. More particularly, the invention relates to an apparatus for supporting a data input device on or above a user's lap.

BACKGROUND

For many years personal computer input devices such as keyboards, game-pads and mice have been connected via cable to the functional components of the computer. This configuration provides the computer user with substantial flexibility in locating such devices and thereby makes data entry more comfortable and efficient. Moreover, in recent years, corresponding to an increased use of wireless technology in the computer industry, input devices are frequently physically detached from the rest of the computer altogether with an infared data connector, allowing the user substantially more leeway in choosing an area in which to operate the computer.

The most common problem associated with this detached design is that the preferred areas of operation often do not provide adequate structural support for input devices. This is also a problem familiar to laptop users who commonly use their laptops outside of the office. Consequently, such users are often forced to operate keyboards, mice, game-pads and notebook computers directly on their laps. When doing so, they invariably must use one hand to hold the device steady and keep it from sliding around. This leaves only a single hand free for data input—clearly an inefficient and unnecessarily burdensome exercise.

Wireless input devices pose an additional problem. In order for such a device to communicate with its computer (or other data processor), its transmitter must be positioned properly so that the communication signal is not blocked. That is, when a keyboard is operated from a person's lap, that person must make an extra effort to keep the transmitter unobstructed and pointed in the right direction. Considering the ever-increasing use of both laptops and wireless input devices in businesses and homes, a more stable implementation is warranted.

SUMMARY

The keyboard saddle of the preferred embodiment comprises a lap-mounted primary frictional surface and computer input device attachment means fixedly attached to said lap-mounted frictional surface and removably attachable to said input device.

BRIEF DESCRIPTION OF THE DRAWINGS

A preferred embodiment of the present invention is described herein with reference to the drawings wherein:

FIG. 1 is a perspective top view of a preferred embodiment of the keyboard saddle.

FIG. 2 is a perspective side view of a preferred embodiment of the keyboard saddle.

FIG. 3 is a perspective view of the keyboard saddle attached to a common computer keyboard.

DETAILED DESCRIPTION OF THE PREFERRED EMBODIMENT

Figure 4:
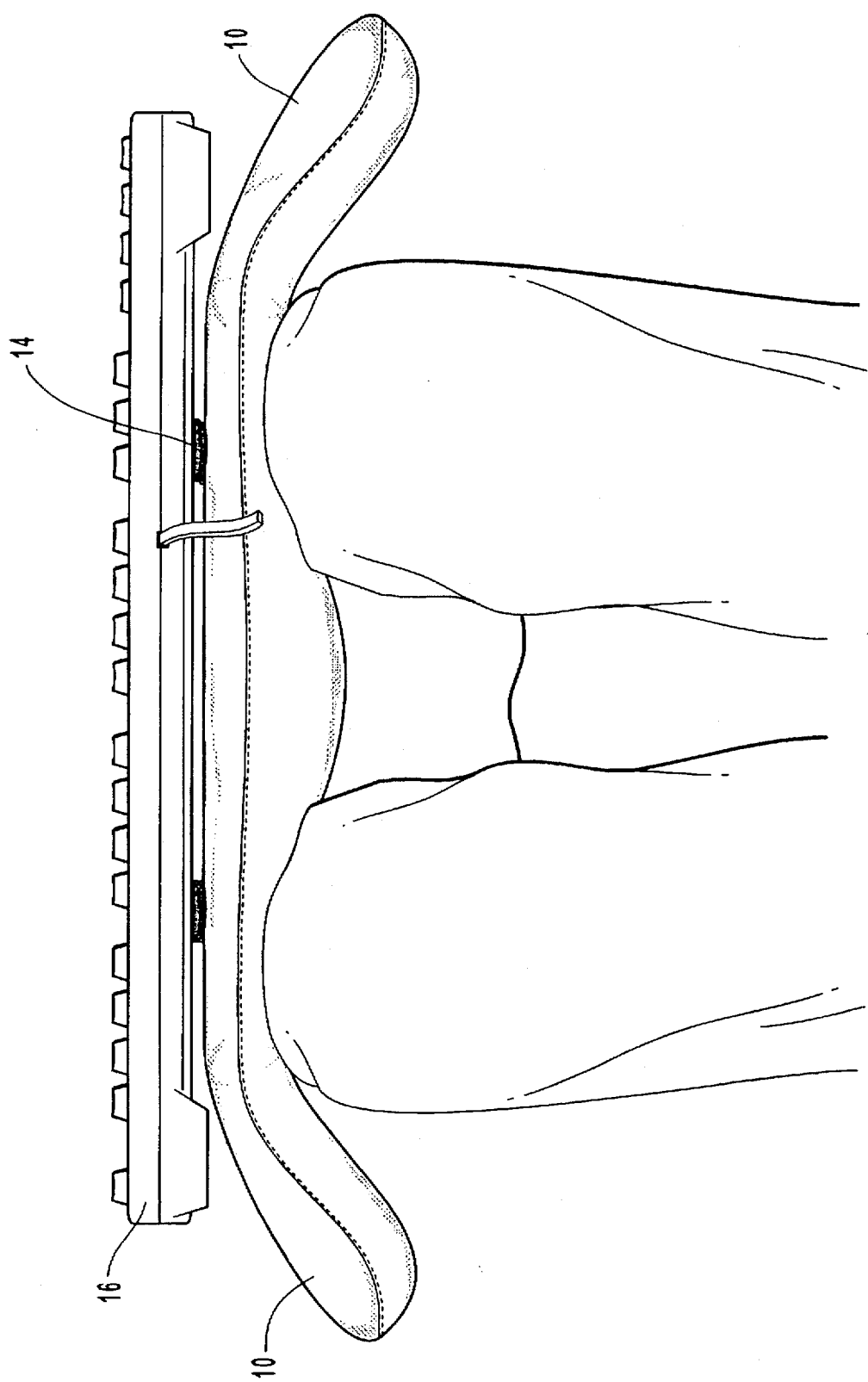
FIG. 4 is a perspective view of the keyboard saddle adapted around the legs of a computer operator.

Referring to FIGS. 1–2, a preferred embodiment of the present invention is shown as a keyboard saddle 8 consisting of a malleable container 10 filled with weighted stuffing material 12 and including input device attachment means 14.

The container 10 may be constructed of numerous different types of rubber or fabric. The preferred type, however, is a non-slippery fabric such as muslin, terrycloth, flannel or suede (that is, non-slippery when in contact with human skin or common clothing material such as cotton and wool—materials against which the container will most often be in contact). Using such fabric will decrease slippage of the saddle 8 and the input device or laptop to which it is removably connected.

Down or foam may be used as stuffing material 12 but heavier material such as sand or propylene is preferred. Heavier material will counteract the weight of the input device or laptop and will thereby allow the user to manipulate the orientation of the device more effectively. Regardless of which type of stuffing material 12 is used, the container 10 should be under-stuffed (i.e., not completely filled) so that it will conform around the user's legs (See FIG. 4).

In a preferred embodiment, the malleable container 10 is shaped so that it is particularly suitable for use with a specific input device. For example, when used with a full-sized keyboard, the container 10 should be slightly longer than when used with a laptop. Another factor to be considered is the weight of the input device. A particularly heavy input device will require a heavy saddle 8 as a counterbalance. As a general rule, the saddle 8 should be long enough to fit across the users legs and wide enough to provide adequate structural support for the input device.

The attachment means 14 should provide for simple attachment and detachment of the saddle 8 to and from the input device. This is important because the user may want to detach the saddle 8 for convenience (e.g., when an adequate support surface is available). Standard snaps, clamps or buttons may be used as attachment means 14. However, VELCRO hook and loop loop attachment means 14 is preferred due to its low cost and ease of installation.

The attachment maens 14 may be fixedly sewn on to the malleable container 10. Moreover, VELCRO hook and loop attachment means 14 can be purchased in a form comprising an adhesive surface which provide for simple, permanent attachment the input device. In a preferred embodiment, one or more strips of VELCRO material are affixed on an upper surface of the saddle 8. Cooperation portion of hook material are affixed to the underside of the input device. As shown in FIG. 3—which illustrates the attachment of a typical computer keyboard 16—the input device may then be attached to the saddle 8 by matching up the VELCRO strips with corresponding VELCRO® hook strips and pressing the two materials together.

The saddle 8 should be attached to the input device at one or more points between the ends of the saddle 8 so that the ends rotate freely around the point of attachment. As illustrated in FIG. 4, this will allow the ends of the saddle 8 to be adapted around the user's legs and will thereby provide additional stability for the input device.

Figure 5:
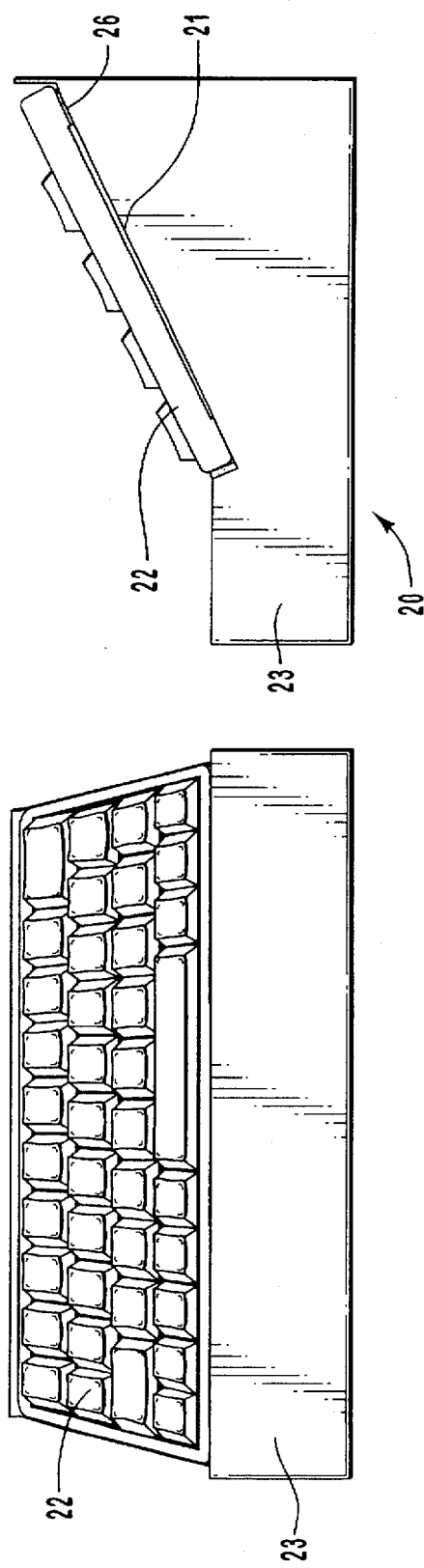
FIG. 5 is a perspective view of a keyboard saddle with its keyboard support surface sloped at an angle and including a wrist support.

Referring to FIG. 5, in an alternative embodiment, the keyboard saddle 20 comprises a sloped support surface 21 to which a keyboard 22 may be attached. Also included is a wrist support 23 to make keyboard operation more comfortable. In contrast to the malleable container embodiment described above, the present embodiment comprises a more rigid outer surface which allows the user to accurately position the input device at a predetermined slope.

The same input device attachment means 26 set forth in the previous embodiment may be used to removably attach the input device to the surface 21. One or more VELCRO look strips may be adhesively connected to the top of the sloped surface 21, and corresponding hook strips may be attached to the input device. Temporarily attaching the input device is as simple as matching up the VELCRO and hook strips and applying pressure.

Figure 6:
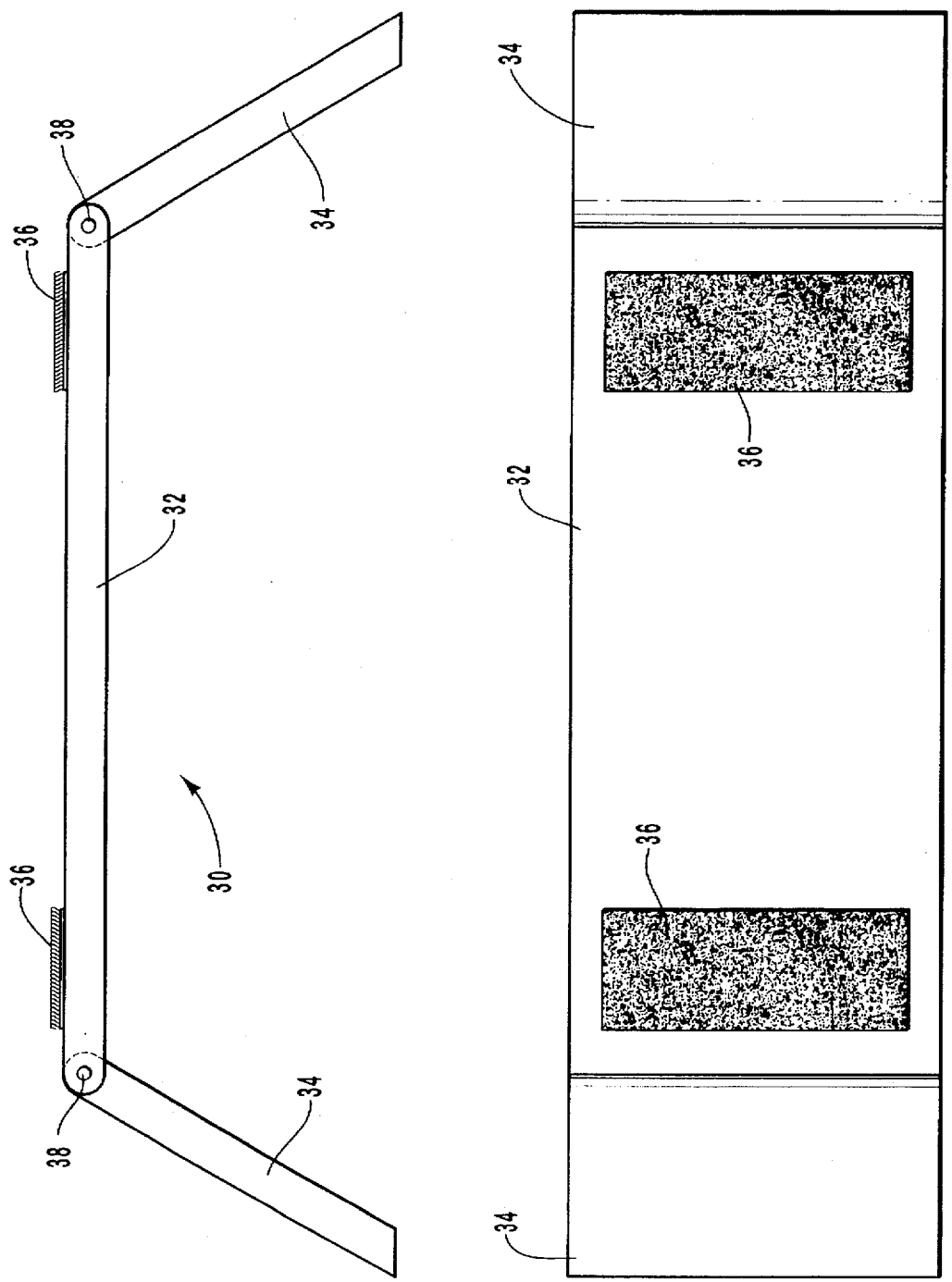
FIG. 6 is a perspective view of a keyboard saddle implementing a solid support surface and legs.

Referring to FIG. 6, also contemplated is a saddle 30 composed of a solid, substantially flat surface 32, supported by two or more legs 34. Input device attachment means 36 are located on the top of the support surface 32 and allow uncomplicated attachment and detachment of the input device. Once again, VELCRO loop-hook strips may be implemented as described above.

In this embodiment, the keyboard saddle need not come in contact with the user's legs because the surface 32 to which the input device is removably attached is fully supported by its own legs 34. Hinges 38 are used to connect the legs 34 to the surface 32 of the saddle 30. Consequently, the legs are retractable so that the saddle 30 may be easily stored or transported. Moreover, for that same reason the saddle should be constructed out of a lightweight material.

Figure 7:
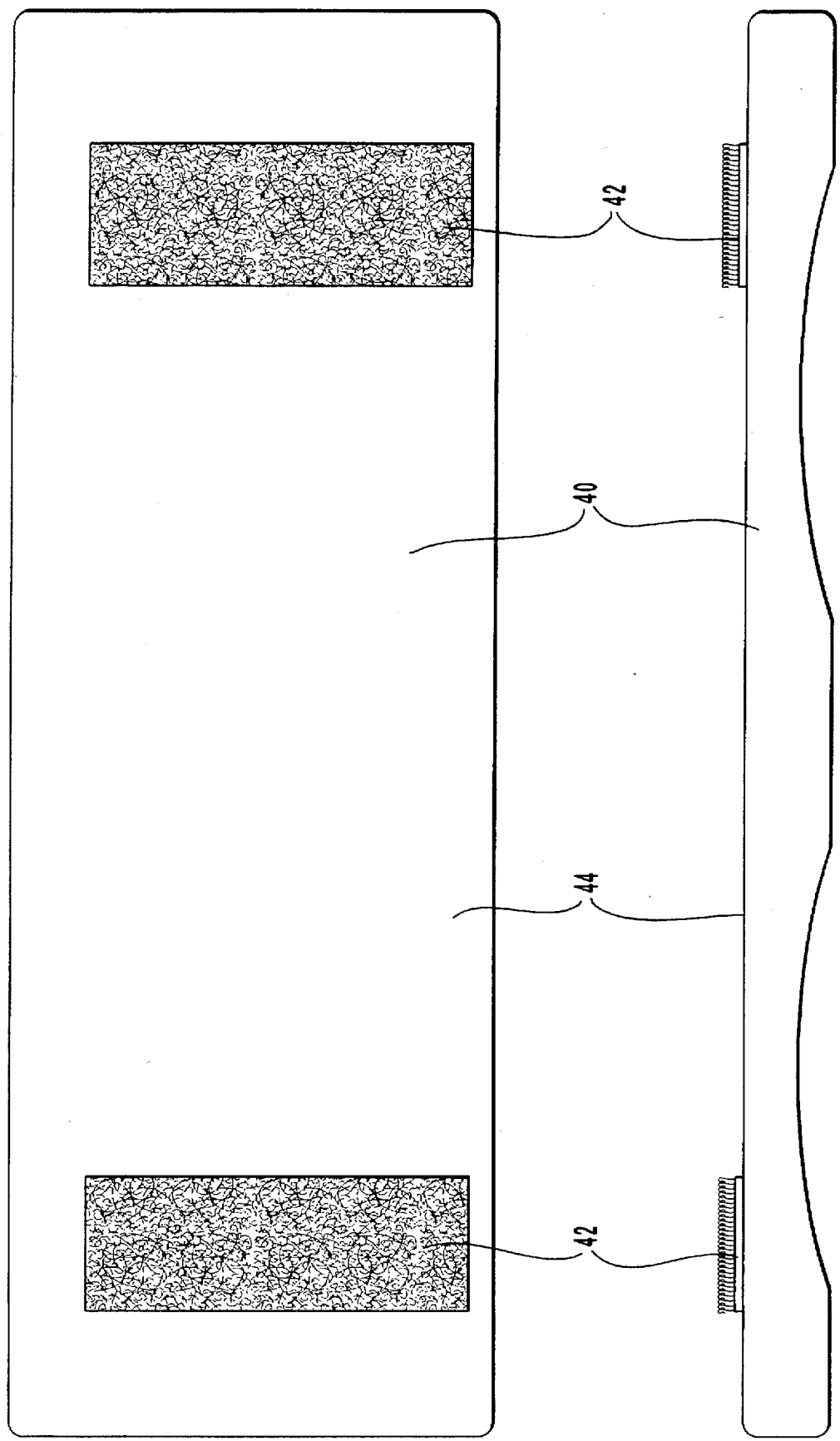
FIG. 7 is a perspective view of a keyboard saddle comprising foam rubber.

Referring to FIG. 7, in another embodiment of the invention, a frictional homogeneous material such as foam rubber saddle 40 is furnished with input device attachment means 42. The attachment means 42 are affixed to the saddle's upper surface 44. Although the foam rubber saddle 40 may not provide all of the benefits of the embodiments described previously, one of the advantages of this design is that is inexpensive to produce and, at the same time, is still quite effective at supporting an input device on a user's lap. As shown in FIG. 4, the underside of the saddle 40 should be formed to conform around the user's legs.

What is claimed is:

1. An apparatus for use a keyboard saddle which is adapted to sit on a user's legs while the user is using a keyboard, and which will comfortably and reliably hold the keyboard in place while in use, comprising:

a pillow-like container means for conforming around and between the user's legs and for directly supporting the keyboard thereon, said container means being formed of a material that is essentially non-stippery when placed on the user's legs or clothing;

means for placement within said container means and for causing the container means to assume a weighted, malleable character so that the container means will thereafter have sufficient weight to essentially counteract the weight of the keyboard, while remaining highly malleable and conformable to the user's logs when placed thereon; and means for removably securing the keyboard directly to the top of the pillow-like container means so that the keyboard can be selectively and easily attached and detached therefrom.

2. An apparatus as defined in claim 1 therein said means for removably securing the keyboard is fixedly attached to said container means between opposite ends of said container means, allowing said container means to move freely around said means for removably securing the keyboard.

3. An apparatus as defined in claims 1 or 2 wherein said means for removably securing the keyboard comprises a hook and loop fastener.

4. A keyboard saddle which is adapted to sit on a user's legs while the user is using a keyboard, and which will comfortably and reliably hold the keyboard in place while in use, comprising:

a pillow-like container formed of a material that is essentially non-slippery when placed on the user's legs or clothing, said container conforming around and between the user's legs and directly supporting the keyboard thereon;

stuffing material placed within said container, said stuffing material having sufficient weight to essentially counteract the weight of the keyboard, and causing the container to assume a weighted, malleable character so that the container will conform to the user's legs when placed thereon; and hook and loop fastners secured directly to the top of the pillow-like container so that the keyboard can be selectively and easily attached and detached therefrom.

* * * * *

UNITED STATES PATENT AND TRADEMARK OFFICE
CERTIFICATE OF CORRECTION

PATENT NO. : 5,893,540
DATED : April 13, 1999
INVENTOR(S) : Elizabeth K. Scott

It is certified that error appears in the above-identified patent and that said Letters Patent is hereby corrected as shown below:

Col. 2 ln. 47: after "loop" delete "loop"

Col. 2 ln. 49: after "attachment" change "maens" to --means--

Col. 2 In. 53: after "attachment" insert --of--

Col. 2 In. 54: after "VELCRO" insert --loop--

Col. 2 In. 55: after "saddle 8." change "Cooperation portion" to --Cooperating portions--

Col. 2 ln 59: after "VELCRO" insert --loop--

Col. 3 ln. 12: before "strips" change "look" to --loop--

Col. 3 ln. 15: after "VELCRO" insert --loop--

Col. 3 ln. 40: after "that" insert --it--

Signed and Sealed this

Thirtieth Day of May, 2000

Attest:

Q. TODD DICKINSON

*Attesting Officer*       *Director of Patents and Trademarks*